(12) United States Patent
Jang et al.

(10) Patent No.: US 7,800,723 B2
(45) Date of Patent: Sep. 21, 2010

(54) LIQUID CRYSTAL DISPLAY PANEL HAVING ION TRAP STRUCTURE AND LIQUID CRYSTAL DISPLAY INCLUDING THE SAME

(75) Inventors: Yun Jang, Suwon (KR); Seung Ju Lee, Gwangmyeong (KR); Seung Hee Lee, Seoul (KR); Joon Hyung Park, Seoul (KR); Myeong-Ha Kye, Seoul (KR); Kyoung Jin Lee, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 11/958,019

(22) Filed: Dec. 17, 2007

(65) Prior Publication Data

US 2008/0174728 A1 Jul. 24, 2008

(30) Foreign Application Priority Data

Jan. 20, 2007 (KR) .................. 10-2007-0006376

(51) Int. Cl.
*G02F 1/1337* (2006.01)
(52) U.S. Cl. .................. 349/123; 349/128; 349/129
(58) Field of Classification Search .................. 349/110, 349/123, 128, 129, 155, 156, 122
See application file for complete search history.

(56) References Cited

U.S. PATENT DOCUMENTS 5,936,693 A * 8/1999 Yoshida et al. .............. 349/139

6,881,455 B2 4/2005 Fukuoka et al.
2007/0146563 A1* 6/2007 Yun et al. .................... 349/36

FOREIGN PATENT DOCUMENTS

| JP | 7-36045 | 2/1995 |
|---|---|---|
| JP | 9-54325 | 2/1997 |
| JP | 2001188233 | 7/2001 |
| JP | 2003233075 | 8/2003 |
| JP | 2005258002 | 9/2005 |
| JP | 2005265952 | 9/2005 |
| KR | 1020010028670 | 4/2001 |
| KR | 1020020039556 | 5/2002 |
| KR | 1020030057231 | 7/2003 |
| KR | 1020050113747 | 12/2005 |
| KR | 1020060087327 | 8/2006 |

* cited by examiner

*Primary Examiner*—Dung T Nguyen
*Assistant Examiner*—Tai Duong
(74) *Attorney, Agent, or Firm*—H.C. Park & Associates, PLC

(57) ABSTRACT

Disclosed is a liquid crystal display panel having an ion trap structure and a liquid crystal display including the same. The liquid crystal display panel has an opening area and a non-opening area and includes a first substrate, a second substrate that faces the first substrate, and a liquid crystal layer interposed between the first and the second substrates. The first substrate includes a plurality of unit pixels and a first alignment film having a first area and a second area. The first area of the first alignment film is disposed on the opening area, the second area is disposed on the non-opening area, and the second area is thinner than the first area.

14 Claims, 8 Drawing Sheets

LIQUID CRYSTAL DISPLAY PANEL HAVING ION TRAP STRUCTURE AND LIQUID CRYSTAL DISPLAY INCLUDING THE SAME

CROSS REFERENCE TO RELATED APPLICATION

This application claims priority from and the benefit of Korean Patent Application No. 10-2007-0006376, filed on Jan. 20, 2007, which is hereby incorporated by reference for all purposes as if fully set forth herein.

BACKGROUND OF THE INVENTION

1. Field of the Invention

The present invention relates to a liquid crystal display panel having an ion trap structure and a liquid crystal display including the same. More particularly, the present invention relates to a liquid crystal display panel having an ion trap structure to reduce an ion impurity concentration of liquid crystal so that the image quality of a liquid crystal display panel may be improved, and a liquid crystal display including the same.

2. Discussion of the Background

A residual image in a liquid crystal display results from various complex factors. It is known that ion impurities in liquid crystal play an important role in the occurrence of a residual image. The concentration of ion impurities in liquid crystal may increase due to problems occurring during the production of liquid crystal display panels, or due to continuous dissolution of ion impurities from various materials that constitute liquid crystal display panels, for example, color filter photoresists, silicon nitride layers, overcoat films, alignment films, and sealants. Ion impurities act as a leakage current while moving in a predetermined direction due to an electric field applied to the liquid crystal, which reduces the voltage holding ratio (VHR) of a liquid crystal capacitor. In addition, since ion impurities having positive and negative electric charges move in directions opposite each other due to an external electric field, an electric double layer may be formed, and subsequently, the voltage applied to the liquid crystal may change, resulting in the occurrence of residual images.

Although the voltage holding ratio may be improved by trapping ion impurities on a surface of a substrate, the occurrence of residual images due to the change in liquid crystal voltage may still occur.

SUMMARY OF THE INVENTION

The present invention provides a liquid crystal display that may be capable of minimizing a reduction in voltage holding ratio of a liquid crystal display due to ion impurities present in a liquid crystal layer, thereby preventing the occurrence of residual images.

Additional features of the invention will be set forth in the description which follows, and in part will be apparent from the description, or may be learned by practice of the invention.

The present invention discloses a liquid crystal display panel having an opening area and a non-opening area. The liquid crystal display panel includes a first substrate, a second substrate facing the first substrate, and a liquid crystal layer interposed between the first substrate and the second substrate. The first substrate includes a plurality of unit pixels and a first alignment film having a first area and a second area. The first area of the first alignment film is disposed on the opening area, the second area is disposed on the non-opening area, and the second area is thinner than the first area.

The present invention also discloses a liquid crystal display panel having an opening area and a non-opening area. The liquid crystal display panel includes a first substrate, a second substrate facing the first substrate; and a liquid crystal layer interposed between the first substrate and the second substrate. The first substrate includes a plurality of unit pixels and a first alignment film, and the second substrate includes a second alignment film having a third area and a fourth area. The third area of the second alignment film is disposed on the opening area, the fourth area is disposed on the non-opening area, and the fourth area is thinner than the third area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporate in and constitute a part of this specification, illustrate embodiments of the invention, and together with the description serve to explain the principles of the invention.

DETAILED DESCRIPTION OF THE ILLUSTRATED EMBODIMENTS

Figure 1:
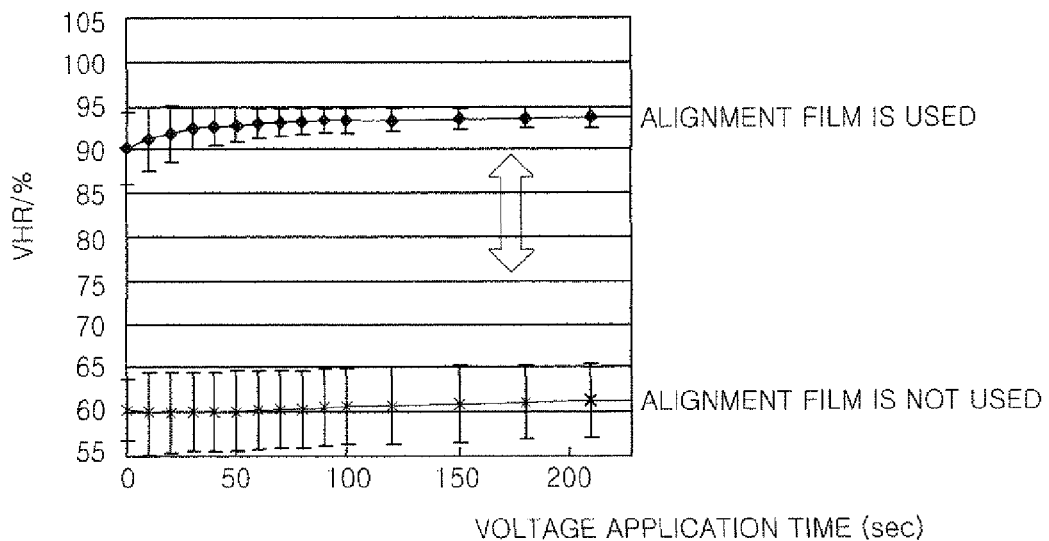
FIG. 1 is a graph showing voltage holding ratios when an alignment film is used and showing voltage holding ratios when an alignment film is not used.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
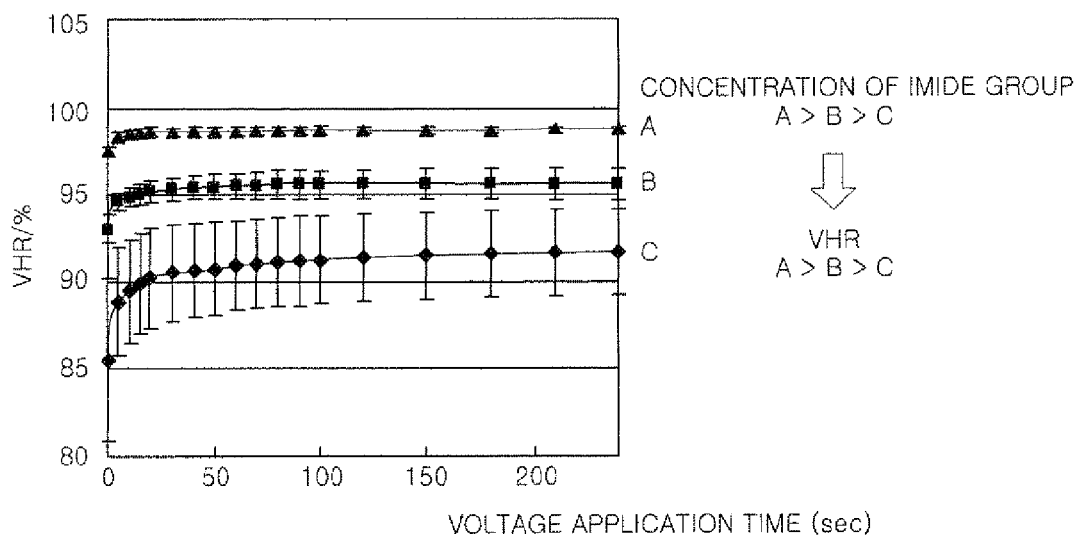
FIG. 2 is a graph showing a relationship between the concentration of an imide group in an alignment film and the voltage holding ratio.

FIG. 1 is a graph showing voltage holding ratios when an alignment film is used and voltage holding ratios when an alignment film is not used, and FIG. 2 is a graph showing a relationship between the concentration of an imide group and the voltage holding ratio for the alignment film.

Referring to FIG. 1 and FIG. 2, an alignment film is disposed at the uppermost layer of a thin film transistor substrate and a color filter substrate, and the surface of the alignment film is rubbed to align liquid crystal molecules in a predetermined direction. The alignment film may include a polyimide (PI) based polymer compound that is mainly formed through imide bonding because such a material provides alignment stability, durability, and productivity.

In FIG. 1, voltage holding ratios (VHR) when the alignment film is used and when the alignment film is not used are compared. As shown in FIG. 1, the initial voltage holding ratio is about 60% when the alignment film is not used. However, the initial voltage holding ratio increases to about 90% when the alignment film is used. Furthermore, it may be deduced that the voltage holding ratio increases as time passes and ions are trapped by imide groups.

In FIG. 2, voltage holding ratios of alignment films having different imide concentrations are compared to each other. With reference to FIG. 2, it may be deduced that the ions are trapped by the alignment film, specifically, by the imide groups of the alignment film, thereby increasing the voltage holding ratio.

The alignment film having a higher imide concentration has a higher voltage holding ratio than the alignment film having a lower imide concentration. The ions of the liquid crystal are trapped by the imide groups of the alignment film to reduce the amount of ion impurity in the liquid crystal, which may increase the voltage holding ratio.

As described above, the alignment film may trap the ion impurities in the liquid crystal to increase the voltage holding ratio, as well as to determine the alignment of the liquid crystal molecules.

Figure 3A:
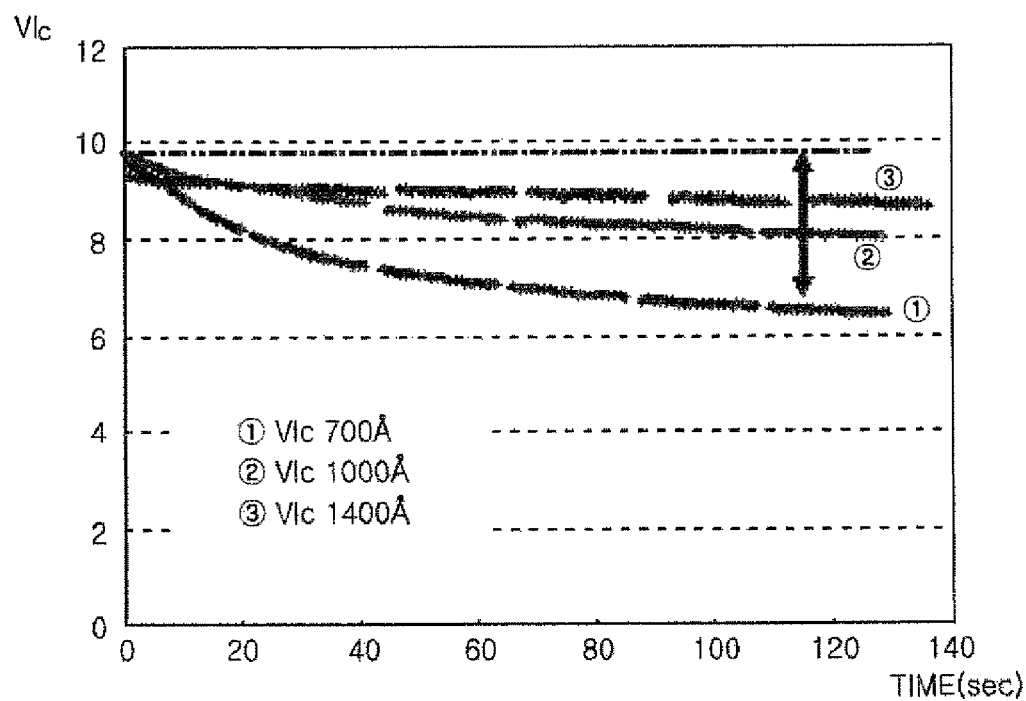
FIG. 3A is a graph showing a change in liquid crystal voltage depending on a thickness of an alignment film.
Figure 3B:
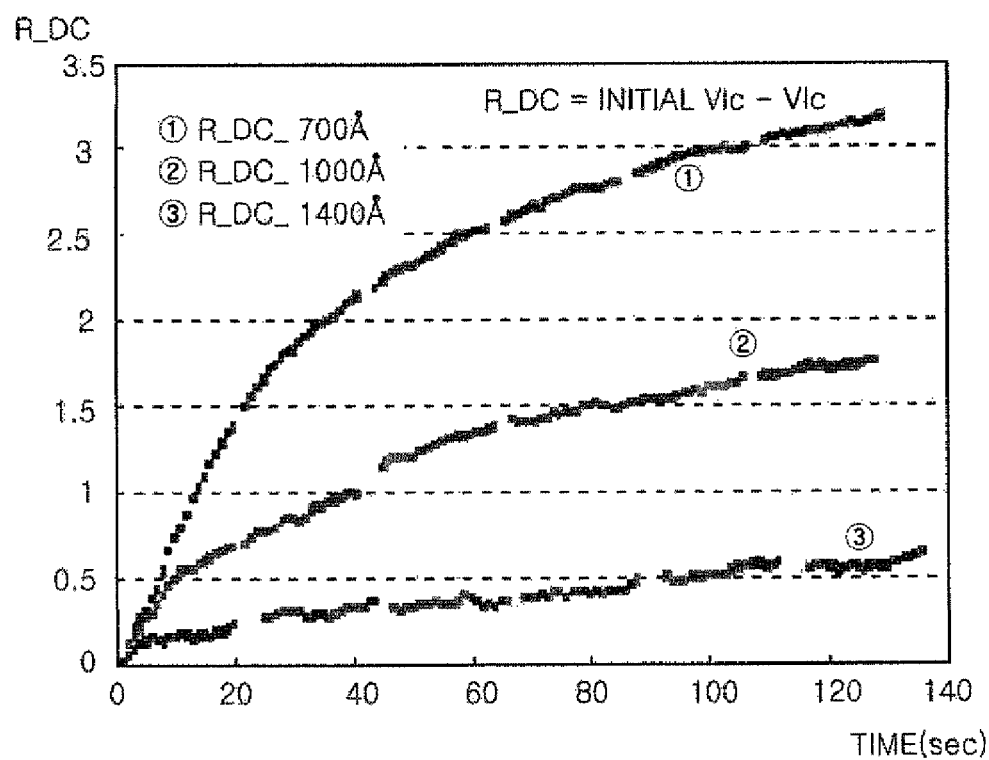
FIG. 3B is a graph showing a change in residual DC voltage depending on a thickness of an alignment film.

FIG. 3A shows a change in liquid crystal voltage $V_{lc}$ depending on time and thicknesses (i.e. 700 Å, 1000 Å, and 1400 Å) of the alignment films when a constant DC voltage of 10 V is applied to a liquid crystal layer, and FIG. 3B shows the intensity of the residual DC voltage generated due to movement of ions in a liquid crystal layer.

Referring to FIG. 3A, it may be deduced that the liquid crystal voltage ($V_{lc}$) applied to both sides of the liquid crystal layer by the external DC voltage is reduced over time due to the movement of the ions present in the liquid crystal layer. Moreover, the reduction in liquid crystal voltage per unit time is the greatest when the alignment film has the smallest thickness (①). On the other hand, the reduction in liquid crystal voltage per unit time is smallest when the alignment film has the maximum thickness (③).

The aforementioned results may be explained by FIG. 3B, which shows that the residual DC voltage (initial liquid crystal voltage—final liquid crystal voltage) increases rapidly as the thickness of the alignment film decreases.

Through the above-mentioned description, it may be deduced that the ions present in the liquid crystal are more easily trapped by the alignment film as the thickness of the alignment film is reduced.

Considering the test results of FIG. 2, FIG. 3A, and FIG. 3B, it may be deduced that the voltage holding ratio of a liquid crystal capacitor may be improved by employing an alignment film that is as thin as possible. However, the generation of a residual image, which is described above, may not be avoided by simply employing a thin alignment film. Both problems may be effectively improved only when the ion impurities are trapped and further, when the distortion of the electric field resulting from the trapped ion impurities is not displayed. The exemplary embodiments of the present invention, which may prevent these problems, will be described with reference to the accompanying drawings hereinafter.

Figure 4:
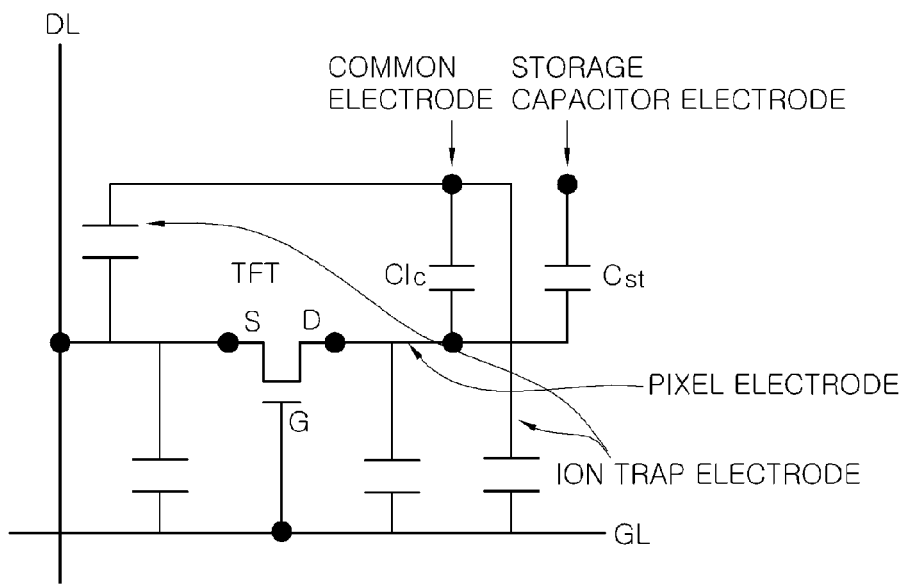
FIG. 4 is a schematic equivalent circuit diagram of a unit pixel of a liquid crystal display panel having an ion trap structure according to an aspect of the invention.

FIG. 4 is a schematic equivalent circuit diagram of a unit pixel of a liquid crystal display panel having an ion trap structure according to an aspect of the invention.

Referring to FIG. 4, the unit pixel of the liquid crystal display panel according to an exemplary embodiment the invention includes a thin film transistor TFT that may be a switch element, and a pixel electrode and a common electrode that may be transparent electrodes. The unit pixel also includes the liquid crystal capacitor $C_{lc}$ of a liquid crystal cell, and a storage capacitor $C_{st}$ and an ion trap electrode that are arranged parallel to the liquid crystal capacitor $C_{lc}$.

The storage capacitor $C_{st}$ maintains the level of the liquid crystal voltage during a frame cycle. The ion trap electrode may trap the ions present in the liquid crystal. Since sufficient DC voltage should be maintained in order to trap the ions, it is preferable that the ion trap electrode has a capacitor structure including the liquid crystal layer as a dielectric and either the common electrode and a gate line GL, or the common electrode and a data line DL as an electrode. In the case of the gate line GL, since an off voltage that is lower than the common voltage of the common electrode is applied thereto for most of the time, an average DC voltage condition may be satisfied. Meanwhile, in the case of the data line DL, voltages having polarities that are different from the common voltage of the common electrode are repeatedly applied thereto. However, because the common voltage is shifted by a predetermined distance to be lower than an average data voltage in order to minimize flickering coming from a kick back phenomenon, the average DC voltage condition may also be satisfied. In a typical liquid crystal display panel, this capacitance is a parasitic capacitance which may not have been taken into consideration in designing the liquid crystal display panel. However, in exemplary embodiments of the present invention, the above-mentioned configuration may form an ion trap structure to trap the ions present in the liquid crystal.

Figure 5A:
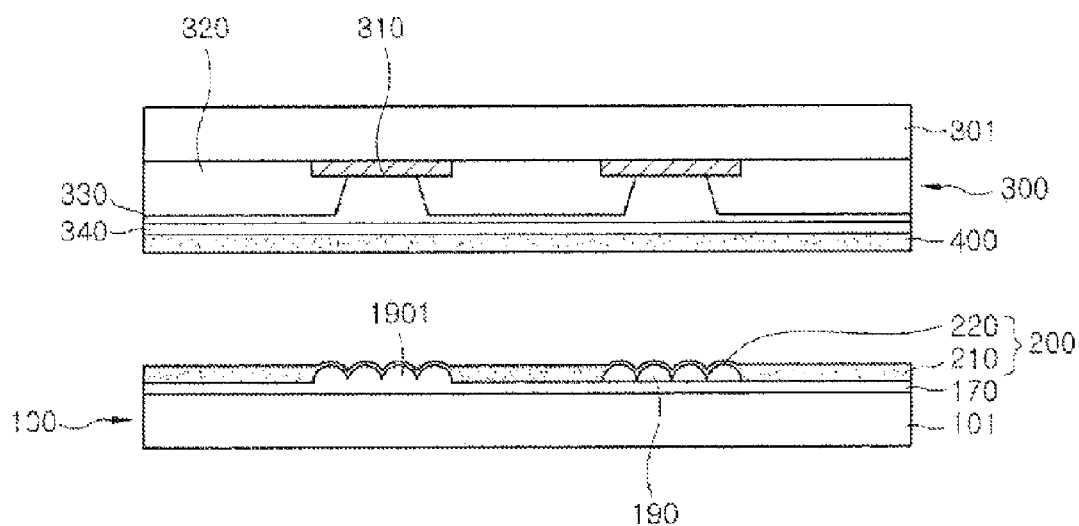
FIG. 5A is a schematic sectional view of a liquid crystal display panel according to a first exemplary embodiment of the invention.
Figure 5B:
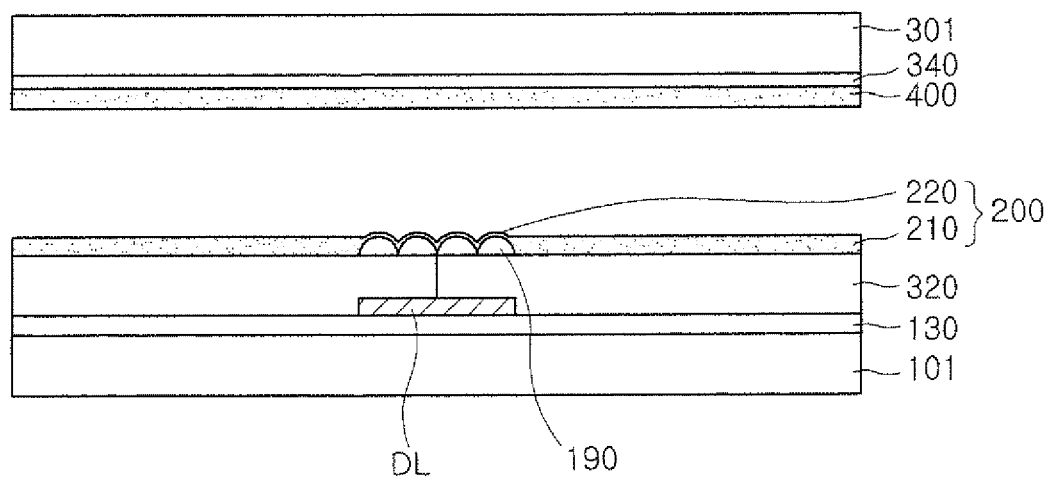
FIG. 5B is a schematic sectional view of modification of the first exemplary embodiment of the invention.
Figure 6:
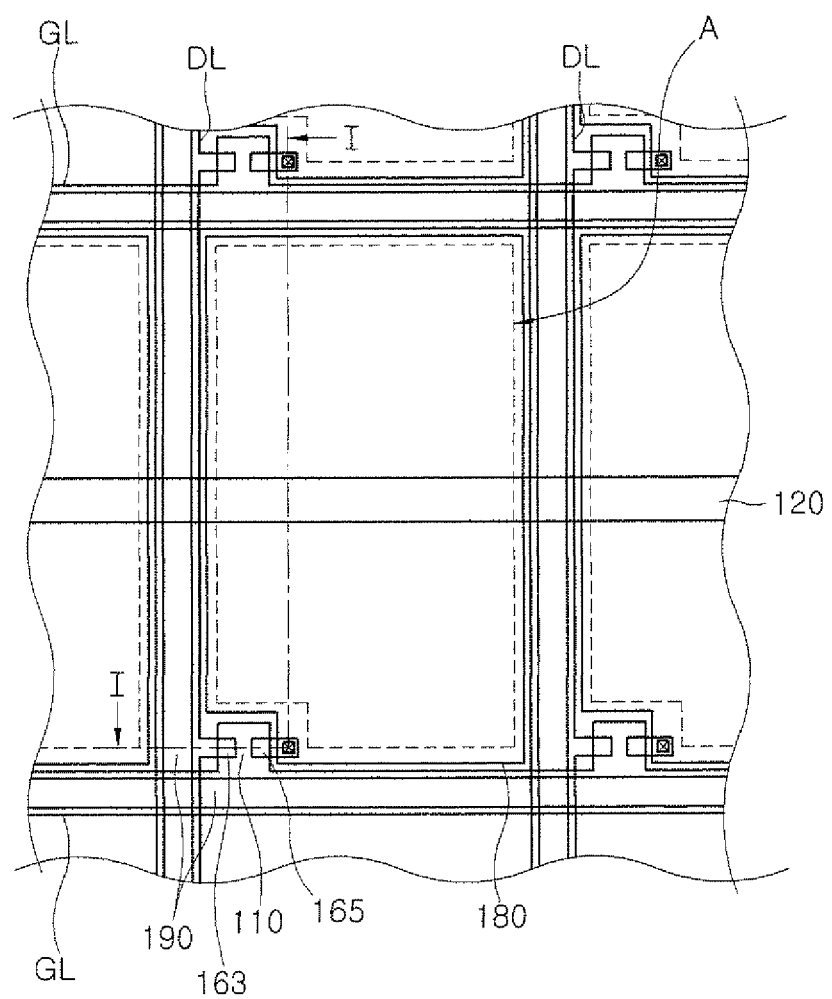
FIG. 6 is a plan view of the liquid crystal display panel according to the first exemplary embodiment of the invention.
Figure 7:
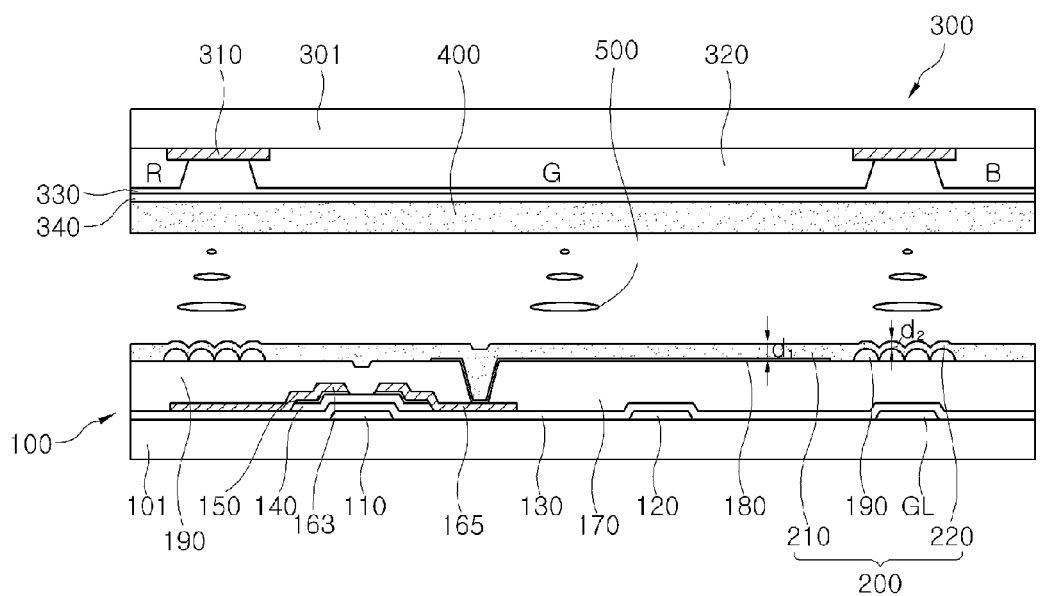
FIG. 7 is a sectional view of the liquid crystal display panel taken along line I-I of FIG. 6.

FIG. 5A and FIG. 5B are schematic sectional views of the liquid crystal display panels according to the first exemplary embodiment of the invention and a modification thereof. FIG. 6 is a plan view of the liquid crystal display panel according to the first exemplary embodiment of the invention, and FIG. 7 is a sectional view of the liquid crystal display panel taken along line I-I of FIG. 6.

Referring to FIG. 5A, the liquid crystal display panel includes a thin film transistor substrate 100, a color filter substrate 300, and a liquid crystal layer (not shown) that is interposed between the thin film transistor substrate 100 and the color filter substrate 300.

The thin film transistor substrate 100 includes a thin film transistor (not shown) and a pixel electrode (not shown) that operate as switch elements formed on a first light transmission insulating substrate 101. The color filter substrate 300 includes black matrices 310, a plurality of color filters 320, an overcoat film 330, and a common electrode 340 that are provided on a second light transmission insulating substrate 301.

A first alignment film 200, which has a non-uniform thickness, is provided on the outermost surface, that is, the uppermost surface, of the thin film transistor substrate 100. The first alignment film 200 has a first area 210, which is relatively thick, and a second area 220, which is relatively thin. A second alignment film 400 is formed on the color filter substrate 300 that faces the thin film transistor substrate 100. The first area 210 of the first alignment film 200 is formed on a passivation film 170, and the second area 220 is formed on first protrusion patterns 190 provided on the passivation film 170. The first area 210 and the second area 220 of the first alignment film 200 may be formed as a single body. The first protrusion patterns 190 are provided under the black matrices 310 that correspond to the non-opening areas of the liquid crystal display panel.

A process of forming the alignment film may include a washing process, a PI print process, a curing process, and a rubbing process. If a fluid polyamic acid is printed on the passivation film 170 and the first protrusion patterns 190 during the PI print process after washing, the first alignment film 200 may be formed so that the second area 220 is relatively thinner than the first area 210. This is because a portion of the polyamic acid flows down from upper portions of the first protrusion patterns 190 before the polyamic acid is cured. Meanwhile, the second alignment film 400 may be formed to have a uniform thickness.

FIG. 5B shows a modification of the first exemplary embodiment, which includes a liquid crystal display panel having a Color filter-on-Array (COA) structure. Referring to FIG. 5B, the liquid crystal display panel includes a thin film transistor substrate 100, an opposite substrate 300, and a liquid crystal layer (not shown) that is interposed between the thin film transistor substrate 100 and the opposite substrate 300.

The thin film transistor substrate 100 includes a thin film transistor (not shown), a pixel electrode (not shown), and a plurality of color filters 320 on the first light transmission insulating substrate 101, and the opposite substrate 300 includes a common electrode 340 provided on a second light transmission insulating substrate 301. The first protrusion patterns 190 may be formed on the data line DL that corresponds to the position of the non-opening area of the liquid crystal display panel. The first area 210 of the first alignment film 200 is formed on the color filters 320, and the second area 220 is formed on first protrusion patterns 190 provided on the color filters 320. The following exemplary embodiments to be described below may be applied to the liquid crystal display panel having the COA structure.

The above-mentioned exemplary embodiment will be described in detail with reference to FIG. 6 and FIG. 7. The liquid crystal display panel includes the thin film transistor substrate 100, the color filter substrate 300, and a liquid crystal layer 500 interposed between the thin film transistor substrate 100 and the color filter substrate 300. The liquid crystal display panel includes a plurality of unit pixels, and each unit pixel includes an opening (see reference numeral A of FIG. 6) through which light is capable of being transmitted and a non-opening (that is, an area other than the opening) through which light is not capable of being transmitted.

The thin film transistor substrate 100 includes a plurality of gate lines GL that extend in a single direction on the first light transmission insulating substrate 101 and a plurality of data lines DL that cross the gate lines GL while being insulated from the gate lines GL. Pixel electrodes 180 are formed in a pixel area defined by the gate lines GL and the data lines DL and the thin film transistor is connected to the gate lines GL, the data lines DL, and the pixel electrodes 180. Storage capacitor electrode lines 120 are formed parallel to the gate lines GL. In addition, the first protrusion patterns 190 are provided on the non-opening areas of the unit pixels to have a line shape. In this exemplary embodiment, the first protrusion patterns 190 are formed in a matrix under black matrices 310 (see FIG. 7) of the color filter substrate 300, that is, in an upper area of the gate lines GL and the data lines DL. However, the shape of the first protrusion patterns 190 is not limited thereto and the first protrusion patterns 190 may be formed to have various shapes.

The thin film transistors respond to a signal transmitted to the gate lines GL to enable a pixel signal transmitted to the data lines DL to be charged in the pixel electrodes 180. The thin film transistors include gate electrodes 110 connected to the gate lines GL, source electrodes 163 connected to the data lines DL, drain electrodes 165 connected to the pixel electrodes 180, a gate insulating film 130 and an activation layer 140 sequentially formed between the gate electrodes 110 and the source electrodes 163 and the drain electrodes 165, and an ohmic contact layer 150 that is provided on at least a portion of the activation layer 140. In this case, the ohmic contact layer 150 may be provided on an area of the activation layer 140 other than a channel portion.

A passivation film 170 is formed on the thin film transistor, and may be made of inorganic substances such as silicon nitrides or silicon oxides, or may be formed of an organic film.

The pixel electrodes 180 and the first protrusion patterns 190 are formed on the passivation film 170. As described above, the first protrusion patterns 190 are provided under the black matrices 310, that is, on the upper area of the gate lines GL and the data lines DL, to have a line shape. Furthermore, the surfaces of the first protrusion patterns 190 may be uneven, and the uneven surfaces may help an alignment solution to flow down from the surfaces of the first protrusion patterns 190 and maximize the area of the second area 220 of the first alignment film 200 provided on the first protrusion patterns 190. Moreover, the first protrusion patterns 190 may be provided on the passivation film 170 as a separate layer that is different from the passivation film 170, or as shown in FIG. 5A, the first protrusion patterns 1901 may be formed of an uneven portion that is integrally formed along with the passivation film 170 using a slit mask or a half tone mask during formation of the passivation film 170. Alternatively, after a first passivation film (not shown) having an uneven pattern is formed, a second passivation film having a uniform thickness may be provided thereon to make a predetermined portion uneven.

An alignment film 200 is provided on the outermost surface of the thin film transistor substrate 100 and includes a first area 210 having a first thickness $d_1$ and a second area 220 having a second thickness $d_2$. The first area 210 and the second area 220 may be formed as a single body. The first area 210 may be formed on the opening area, and the second area 220 may be formed on the non-opening area. Since the second area 220 may be formed on the first protrusion patterns 190 provided on the non-opening area, the second thickness $d_2$ of the second area 220 may be smaller than the first thickness $d_1$ of the first area 210.

The color filter substrate 300 includes black matrices 310 provided on the second light transmission insulating substrate 301, a plurality of color filters 320, and an overcoat film 330 and a common electrode 340 sequentially provided on a plurality of color filters 320. In this exemplary embodiment, the overcoat film 330 is formed to planarize a surface on which the common electrode 340 is to be provided, but may be omitted in some cases.

The black matrices 310 are formed at interfaces between the pixels to divide the color filters and to block light transmitting through the liquid crystal cell of an area that is not controlled using the pixel electrode of the thin film transistor substrate, thereby defining the opening area A.

A plurality of color filters 320 may be made of a resin film that contains dyes or pigments having three primary colors (i.e. red, green, and blue colors). The color filters 320 are separated from each other by the black matrices 310 and disposed at predetermined intervals. The common electrode 340 is provided on the overcoat film 330, and may be made of a transparent conductive substance such as indium tin oxide (ITO) or indium zinc oxide (IZO).

The second alignment film 400 that has a uniform thickness is provided on the outermost surface of the color filter substrate 300. That is, the second alignment film 400 having a third thickness $d_3$ is provided on the common electrode 340.

If the first protrusion patterns 190 are provided under the non-opening area, that is, under the black matrix 310, brightness may not significantly be affected and the second area 220 of the first alignment film 200 formed on the non-opening area may be thinner than the first area 210 formed on the opening area A, as shown in FIG. 3A and FIG. 3B. This is because the amount of trapped ion impurities is inversely proportional to the thickness of the alignment film 200 and most of the ion impurities contained in the liquid crystal 500 are trapped by the first area 210 of the first alignment film 200 provided in the non-opening area. Therefore, distortion of the electric field mainly occurs in the non-opening area, which may significantly reduce the visibility of the residual image. Particularly, if the ion impurities are trapped by the alignment film 200 formed on the protrusion patterns 190 like the above-mentioned exemplary embodiment, a trapping area may be maximized, thereby maximally increasing the trapping of ion impurities.

Figure 8:
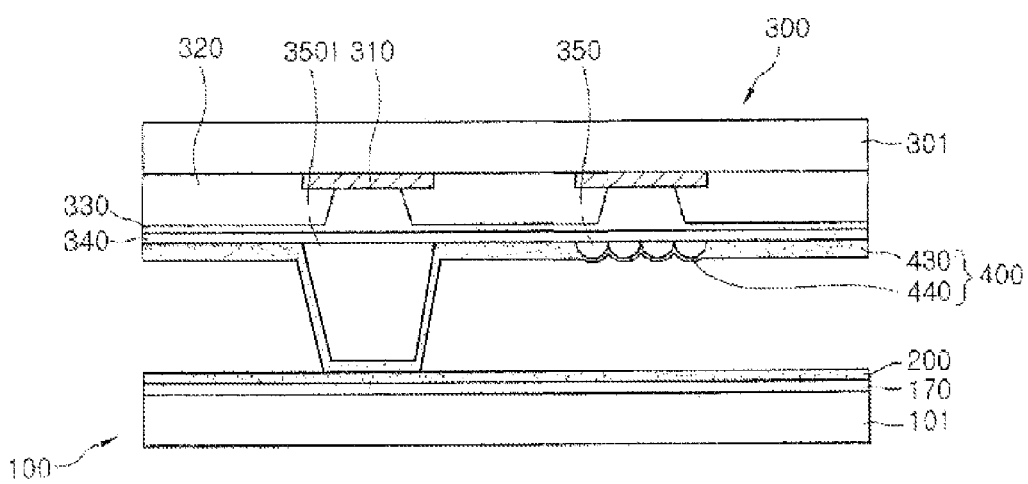
FIG. 8 is a schematic sectional view of a liquid crystal display panel according to a second exemplary embodiment of the invention.
Figure 9:
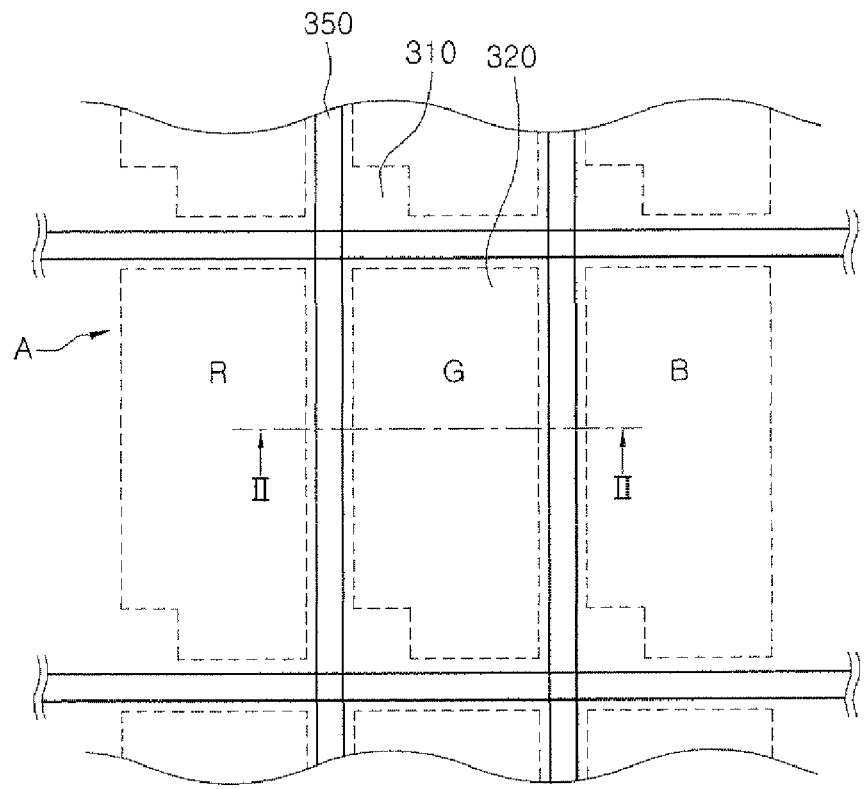
FIG. 9 is a plan view of the liquid crystal display panel according to the second exemplary embodiment of the invention.
Figure 10:
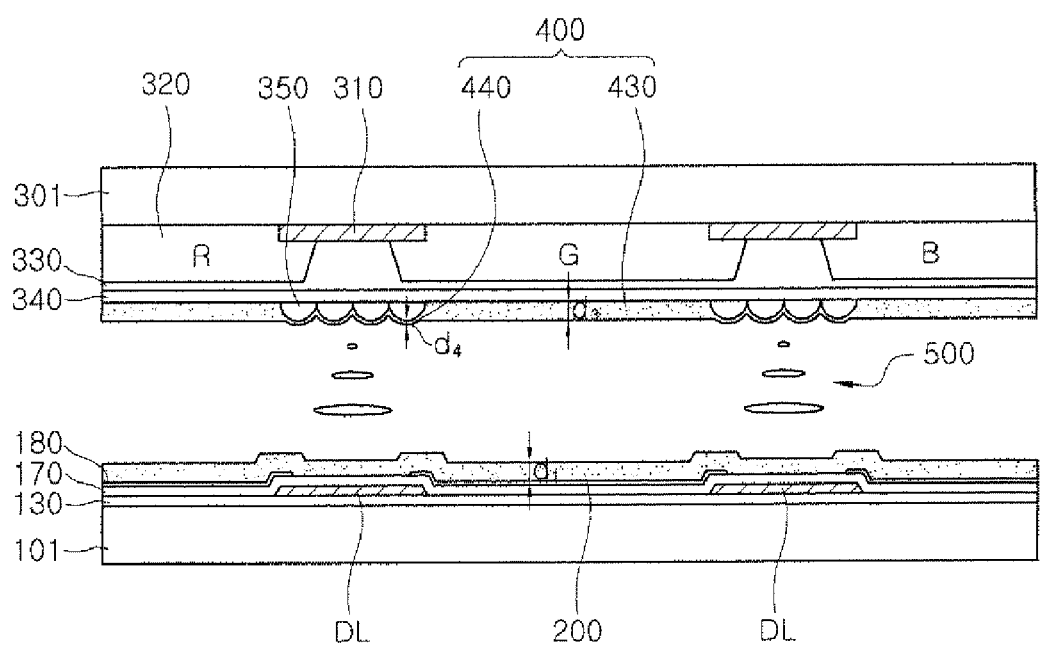
FIG. 10 is a sectional view of the liquid crystal display panel taken along line II-II of FIG. 9.

FIG. 8 is a schematic sectional view of a liquid crystal display panel according to a second exemplary embodiment of the invention, FIG. 9 is a plan view of the liquid crystal display panel according to the second exemplary embodiment of the invention, and FIG. 10 is a sectional view of the liquid crystal display panel taken along line II-II of FIG. 9. Constituent elements of the second exemplary embodiment of the invention are almost the same as those of the first exemplary embodiment of the invention, except that the protrusion patterns are formed at different positions. Accordingly, the following description will focus on the difference between the two exemplary embodiments.

With reference to FIG. 8, FIG. 9, and FIG. 10, the liquid crystal display panel includes a thin film transistor substrate 100, a color filter substrate 300, and a liquid crystal layer 500 that is interposed between the thin film transistor substrate 100 and the color filter substrate 300.

The thin film transistor substrate 100 includes the thin film transistor (not shown) and a pixel electrode (not shown) that act as switch elements on the first light transmission insulating substrate 101. The color filter substrate 300 includes black matrices 310 provided on a second light transmission insulating substrate 301, a plurality of color filters 320, an overcoat film 330, and a common electrode 340.

A first alignment film 200 has a uniform thickness and is provided on the outermost surface of the thin film transistor substrate 100. The first alignment film 200 has a first thickness $d_1$ and is formed to cover the pixel electrode 180 and the passivation film 170.

The second alignment film 400 does not have uniform thickness and is provided on the outermost surface of the color filter substrate 300. The second alignment film 400 has a third area 430, which is relatively thick, and a fourth area 440, which is relatively thin. The third area 430 and the fourth area 440 may be formed as a single body. Second protrusion patterns 350 are provided on a common electrode 340 of the color filter substrate 300, and also on the black matrices 310 that correspond to the non-opening areas of the liquid crystal display panel. The third area 430 of the second alignment film 400 has a third thickness $d_3$ and is formed on the common electrode 340, and the fourth area 440 a the fourth thickness $d_4$ and is formed on the second protrusion patterns 350 provided on the common electrode 340. Like the first area 210 and the second area 220 of the first alignment film 200 according to the exemplary embodiment of FIG. 5, FIG. 6, and FIG. 7, the fourth area 440 may be thinner than the third area 430.

The second protrusion patterns 350 are formed on the black matrices 310 to have a line shape. In addition, the surfaces of the second protrusion patterns 350 may be uneven, and the uneven surfaces may help an alignment solution flow down from the surfaces of the second protrusion patterns 350 and maximize the area of the alignment film 400 provided on the second protrusion patterns 350.

The liquid crystal display panel may further include column spacers 3501 provided on the color filter substrate 300 in order to maintain a cell gap between the thin film transistor substrate 100 and the color filter substrate 300. In this case, the second protrusion patterns 350 may be made simultaneously with the column spacers 3501 and may include the same substance as the column spacers 3501.

Figure 11A:
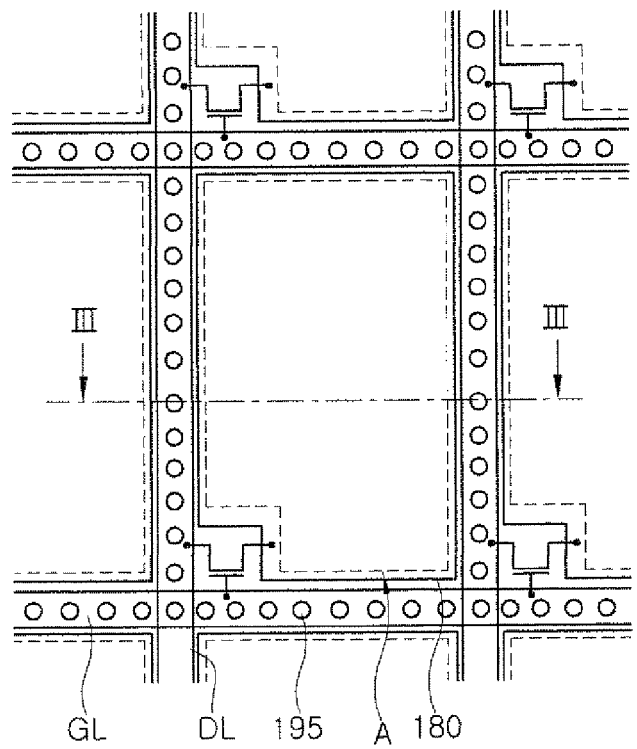
FIG. 11A, FIG. 11B, and FIG. 11C show a plan view and sectional views showing modifications of protrusion patterns of the liquid crystal display panel.
Figure 11B:
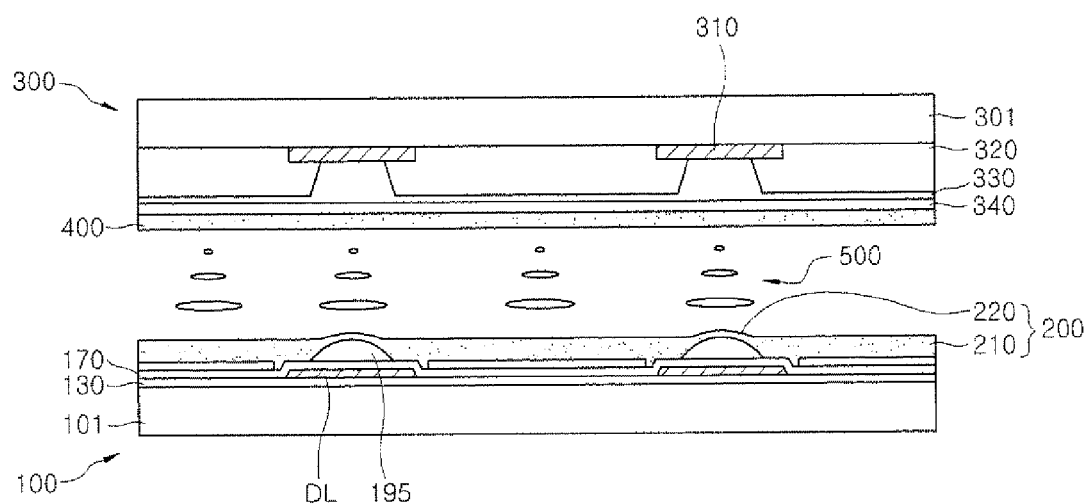
Figure 11C:
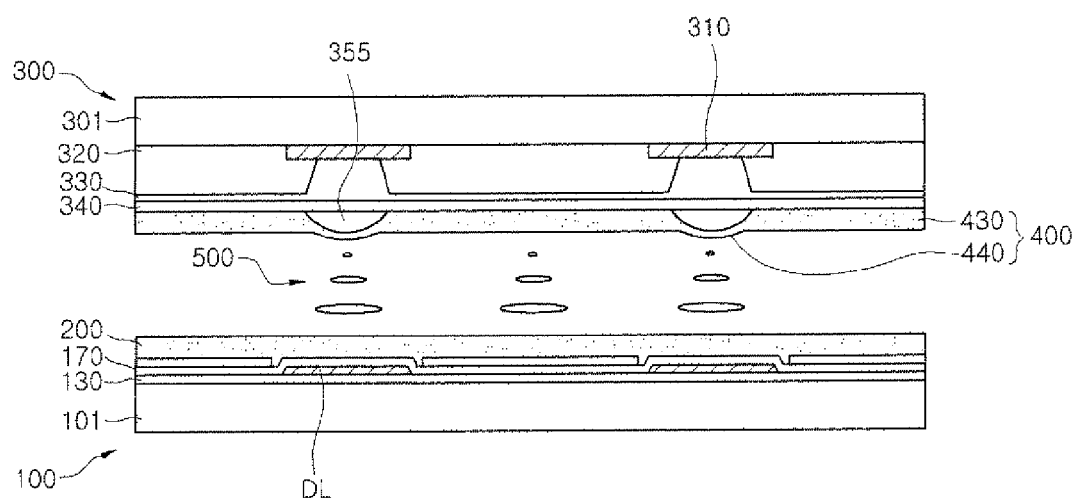

FIG. 11A, FIG. 11B, and FIG. 11C show a plan view and sectional views showing a modification of the protrusion patterns of the liquid crystal display panel.

FIG. 11A is the plan view of the liquid crystal display panel showing a modification of the first protrusion patterns or the second protrusion patterns, FIG. 11B shows a modification of the first protrusion patterns provided on the thin film transistor substrate, and FIG. 11C shows a modification of the second protrusion patterns provided on the color filter substrate. Constituent elements of this exemplary embodiment are almost the same as those of the above-mentioned exemplary embodiments, with the exception of the shape of the protrusion patterns. Accordingly, the description hereinafter will focus mostly on the difference between the exemplary embodiments.

The first protrusion patterns 195 or the second protrusion patterns 355 are provided on the non-opening area, that is, the area of the thin film transistor substrate 100 that corresponds to the black matrix 310 or an upper area of the black matrix 310 of the color filter substrate 300. In this case, the first protrusion patterns 195 or the second protrusion patterns 355 may have a plurality of semicircular dot shapes, respectively, and are disposed apart by predetermined intervals.

Figure 12:
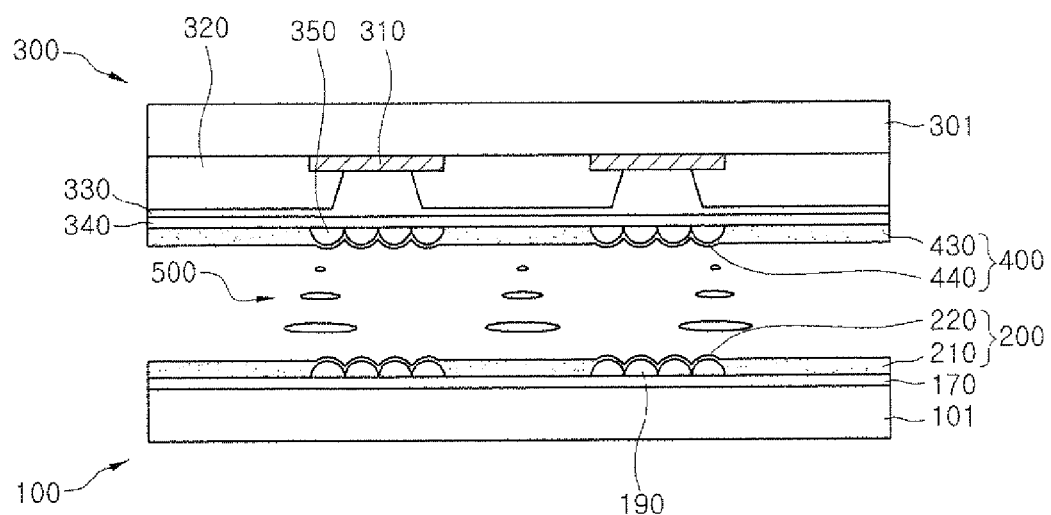
FIG. 12 is a schematic sectional view of a liquid crystal display panel according to a third exemplary embodiment of the invention.

FIG. 12 is a schematic sectional view of a liquid crystal display panel according to a third exemplary embodiment of the invention. Constituent elements of the third exemplary embodiment shown in FIG. 12 are almost the same as those of the above-mentioned exemplary embodiments, except that the first protrusion patterns 190 and the second protrusion patterns 355 are provided on the thin film transistor substrate 100 and the color filter substrate 300. Accordingly, a description hereinafter will be mostly on the difference between the exemplary embodiments.

Referring to FIG. 12, the first alignment film 200 including the first area 210 and the second area 220, the thicknesses of which are different, is provided on the outermost surface of the thin film transistor substrate 100. The first area 210 of the first alignment film 200 is formed on the passivation film 170, and the second area 220 is formed on the first protrusion patterns 190 provided on the passivation film 170. Further, the second area 220 formed on the first protrusion patterns 190 may be thinner than the first area 210.

In addition, the second alignment film 400 including the third area 430 and the fourth area 440, which have different thicknesses, is provided on the outermost surface of the color filter substrate 300. The second protrusion patterns 350 are provided on the common electrode 340 of the color filter substrate 300. Since a substance constituting the fourth area 440, which is formed on the second protrusion patterns 350, easily flows down due to its own characteristics, the fourth area 440 may be thinner than the third area 430. The first protrusion patterns 190 or the second protrusion patterns 350 may be formed to have various shapes. Needless to say, configurations of the former exemplary embodiments may be applied to the first protrusion patterns 190 and the second protrusion patterns 350 of this exemplary embodiment.

Although not shown in the drawings, a liquid crystal display that includes the liquid crystal display panel of the above-mentioned exemplary embodiments and a backlight unit providing light to the liquid crystal display panel may be embodied.

As described above, most ion impurities are trapped by the non-opening area in the liquid crystal display according to the exemplary embodiments of the invention, which may improve a voltage holding ratio of a liquid crystal cell and minimize the occurrence of residual images.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel having an opening area and a non-opening area, the liquid crystal display panel comprising:
    a first substrate comprising a plurality of unit pixels and a first alignment film having a first area and a second area;
    a second substrate facing the first substrate; and
    a liquid crystal layer interposed between the first substrate and the second substrate,
    wherein the first area of the first alignment film is disposed on the opening area, the second area is disposed on the non-opening area, and the thickness of the first alignment film at the second area is thinner than the thickness of the first alignment film at the first area.

2. The liquid crystal display panel of claim 1, wherein the first substrate further comprises first protrusion patterns disposed on the non-opening area, and
    the second area of the first alignment film is disposed on the first protrusion patterns.

3. The liquid crystal display panel of claim 2, wherein the second substrate comprises a black matrix to block light, and
    the first protrusion patterns are disposed in an area corresponding to the black matrix.

4. The liquid crystal display panel of claim 2, wherein the first protrusion patterns have an uneven surface.

5. The liquid crystal display panel of claim 2, wherein the first protrusion patterns comprise a plurality of dots that are spaced apart from each other.

6. The liquid crystal display panel of claim 2, wherein the first substrate further comprises a passivation film, and
    the first protrusion patterns are disposed as a separate layer on the passivation film.

7. The liquid crystal display panel of claim 2, wherein the first substrate further comprises a passivation film, and
    the first protrusion patterns are integrally formed with the passivation film.

8. The liquid crystal display panel of claim 2, wherein the second substrate comprises a second alignment film comprising a third area and a fourth area, and
    the third area of the second alignment film is disposed on the opening area, the fourth area is disposed on the non-opening area, and the thickness of the second alignment film at the fourth area is thinner than the thickness of the second alignment film at the third area.

9. The liquid crystal display panel of claim 8, wherein the second substrate further comprises second protrusion patterns disposed on the non-opening area, and
    the fourth area of the second alignment film is disposed on the second protrusion patterns.

10. The liquid crystal display panel of claim 9, wherein the second substrate further comprises a black matrix to block light, and
    the second protrusion patterns are disposed in an area corresponding to the black matrix.

11. A liquid crystal display panel having an opening area and a non-opening area, the liquid crystal display panel comprising:
    a first substrate comprising a plurality of unit pixels and a first alignment film,
    a second substrate facing the first substrate and comprising a second alignment film having a third area and a fourth area; and
    a liquid crystal layer interposed between the first substrate and the second substrate,
    wherein the third area of the second alignment film is disposed on the opening area, the fourth area is disposed on the non-opening area, and the thickness of the second alignment film at the fourth area is thinner than the thickness of the second alignment film at the third area.

12. The liquid crystal display panel of claim 11, wherein the second substrate further comprises protrusion patterns disposed on the non-opening area, and
    the fourth area of the second alignment film is disposed on the protrusion patterns.

13. The liquid crystal display panel of claim 12, wherein the second substrate further comprises a black matrix to block light, and
    the protrusion patterns are disposed in an area corresponding the black matrix.

14. The liquid crystal display panel of claim 12, wherein the second substrate further comprises column spacers to maintain a cell gap, and
    the protrusion patterns are made of the same substance as the column spacers.

* * * * *